United States Patent
Hopster

(10) Patent No.: US 7,271,583 B2
(45) Date of Patent: Sep. 18, 2007

(54) SYSTEMS AND METHODS FOR DECODING A SIGNAL

(75) Inventor: Joseph Henry Hopster, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 11/098,289

(22) Filed: Apr. 4, 2005

(65) Prior Publication Data

US 2006/0220925 A1 Oct. 5, 2006

(51) Int. Cl.
*G01B 7/30* (2006.01)

(52) U.S. Cl. .............. 324/207.25; 73/514.31; 73/514.39; 702/151

(58) Field of Classification Search .............. 73/514.01–514.02, 514.16–514.17, 514.31, 73/514.32, 514.33, 514.34, 514.39; 324/207.25; 702/115–116, 142, 145, 151
See application file for complete search history.

(56) References Cited

U.S. PATENT DOCUMENTS

| | | | |
|---|---|---|---|
| 4,761,609 A | 8/1988 | Dorman | |
| 4,899,596 A | 2/1990 | Janik et al. | |
| 5,365,787 A | 11/1994 | Hernandez et al. | |
| 6,431,000 B1 | 8/2002 | Ostendorf et al. | |
| 6,498,451 B1 | 12/2002 | Boules et al. | |
| 6,798,192 B2 | 9/2004 | Faymon et al. | |
| 6,816,816 B2 * | 11/2004 | Slates et al. | 702/185 |
| 2005/0150712 A1 * | 7/2005 | Tokumoto | 180/443 |

* cited by examiner

*Primary Examiner*—Bot LeDynh
(74) *Attorney, Agent, or Firm*—William Scott Andes; Armstrong Teasdale LLP

(57) ABSTRACT

A system for decoding a signal of a rotating portion of a machine. The system includes a sensor configured to output N signals based on signals received from the rotating portion, and a processor configured to derive a value from a plurality of differences between sampled data obtained from the N signals.

18 Claims, 5 Drawing Sheets

SYSTEMS AND METHODS FOR DECODING A SIGNAL

BACKGROUND OF THE INVENTION

This invention relates generally to rotating machinery and more particularly, to systems and methods for processing signals from rotating machinery.

A turbine engine includes a variety of parts including a fan. The turbine engine is unbalanced because of abnormalities in the fan. Efficiency of the turbine engine decreases because the turbine engine is unbalanced.

Separate conventional systems are used to decode a wide tooth, a low tooth, and a high tooth signals received from the turbine engine. For example, a first system is used to decode the high tooth signal, a second system is used to decode the low tooth signal, and a third system is used to decode the wide tooth signal. A wide tooth, a low tooth, and a high tooth signal received from the turbine engine is decoded to correct the abnormalities in the fan. In the first system, the high tooth signal is decoded based on a comparison of the signal with a first adjusted threshold. In the second system, the low tooth signal is decoded based on a comparison of the signal with a second adjusted threshold. In the third system, the wide tooth signal is decoded based on a comparison of the signal with a third adjusted threshold. Each of the first, second, and third thresholds are manually adjusted or are a preset value based on a type of engine.

Each of the first, second, and third systems are customized based on whether a signal received from the turbine engine is a high tooth, a low tooth, or a wide tooth signal. For example, the first system is customized for decoding a high tooth signal, the second system is customized for decoding a low tooth signal, and the third system is customized for decoding a wide tooth signal. Separate customization based on the whether a signal received from the turbine engine is a high tooth, a low tooth, or a wide tooth signal results in additional costs and labor. Additionally, adjustment of the first, second, and third adjusted thresholds results in additional labor or cost.

BRIEF SUMMARY OF THE INVENTION

In one aspect, a system for decoding a signal of a rotating portion of a machine is provided. The system includes a sensor configured to output N signals based on signals received from the rotating portion, and a processor configured to derive a value from a plurality of differences between sampled data obtained from the N signals.

In another aspect, a system is provided. The system includes a shaft, a rotating portion attached to said shaft, a sensor configured to output N signals based on signals received from the rotating portion, and a processor configured to derive a value from a plurality of differences between sampled data obtained from the N signals.

In yet another aspect, a method for decoding a signal of a rotating portion of a machine is provided. The method includes generating N signals from signals sensed by the rotating portion, calculating differences between data sampled from the N signals, and computing a value from the differences.

DETAILED DESCRIPTION OF THE INVENTION

Figure 1:
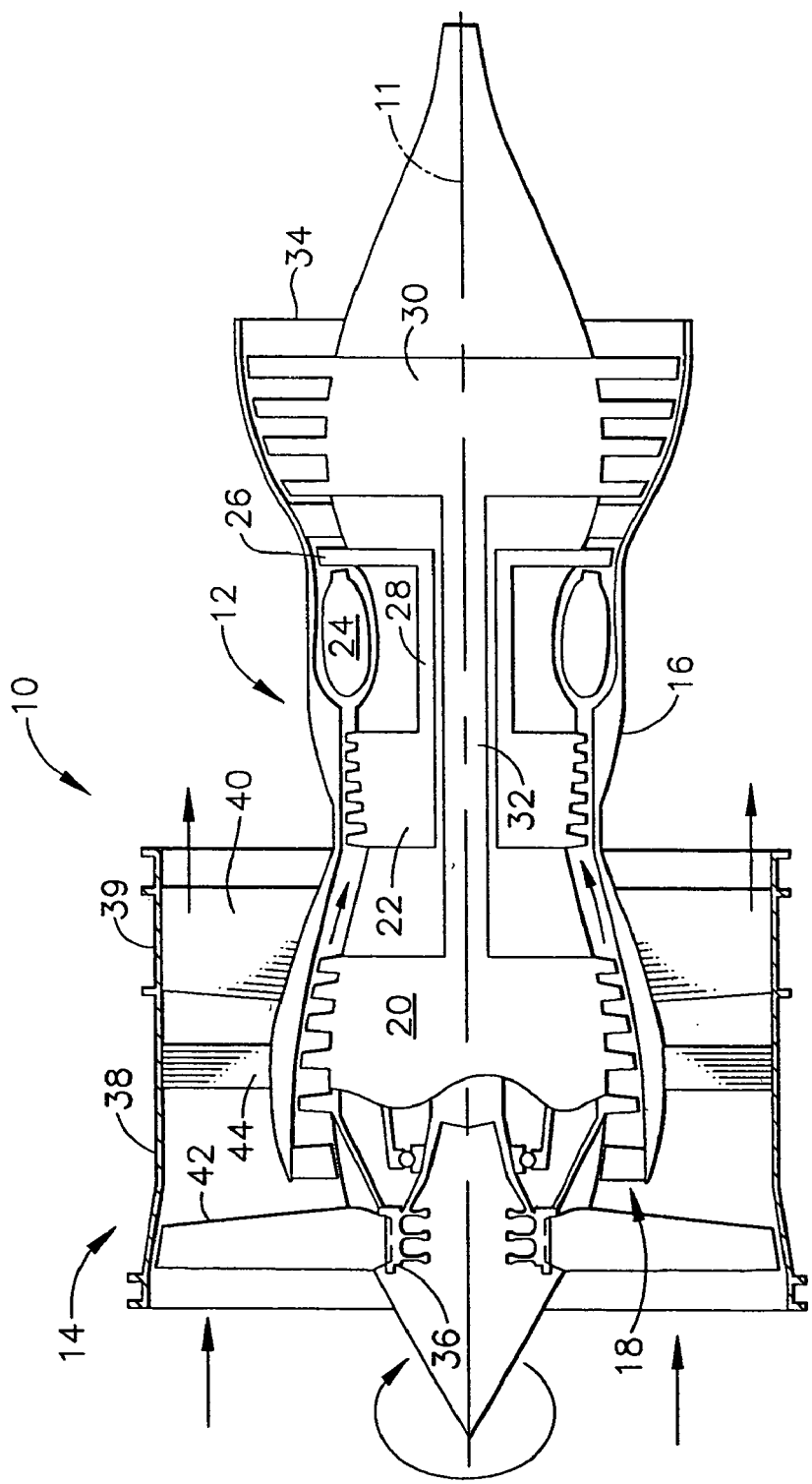
FIG. 1 is a schematic illustration of an exemplary gas turbine engine.

FIG. 1 is a schematic illustration of a gas turbine engine 10 having a longitudinal axis 11, and including a core gas turbine engine 12 and a fan section 14 positioned upstream of core engine 12. In one embodiment, a gear box (not shown) is coupled to gas turbine engine 10. Core engine 12 includes a generally tubular outer casing 16 that defines an annular core engine inlet 18. Casing 16 surrounds a low-pressure booster 20 for raising the pressure of the incoming air to a first pressure level. In one embodiment, engine 10 is a CFM56 engine available from General Electric® Aircraft Engines, Cincinnati, Ohio.

A high pressure, multi-stage, axial-flow compressor 22 receives pressurized air from booster 20 and further increases the pressure of the air to a second, higher pressure level. The high pressure air flows to a combustor 24 and is mixed with fuel. The fuel-air mixture is ignited to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34 to provide propulsive jet thrust.

Fan section 14 includes a rotatable, axial-flow fan rotor 36 that is driven by second turbine 30. An annular fan casing 38 surrounds fan rotor 36 and is supported from core engine 12 by a plurality of substantially radially-extending, circumferentially-spaced support struts 44. Fan rotor 36 carries a plurality of radially-extending, circumferentially spaced fan blades 42. Fan casing 38 extends rearwardly from fan rotor 36 over an outer portion of core engine 12 to define a secondary, or bypass airflow conduit. A casing element 39 that is downstream of and connected with fan casing 38 supports a plurality of fan stream outlet guide vanes 40. The air that passes through fan section 14 is propelled in a downstream direction by fan blades 42 to provide additional propulsive thrust to supplement the thrust provided by core engine 12.

Figure 2:
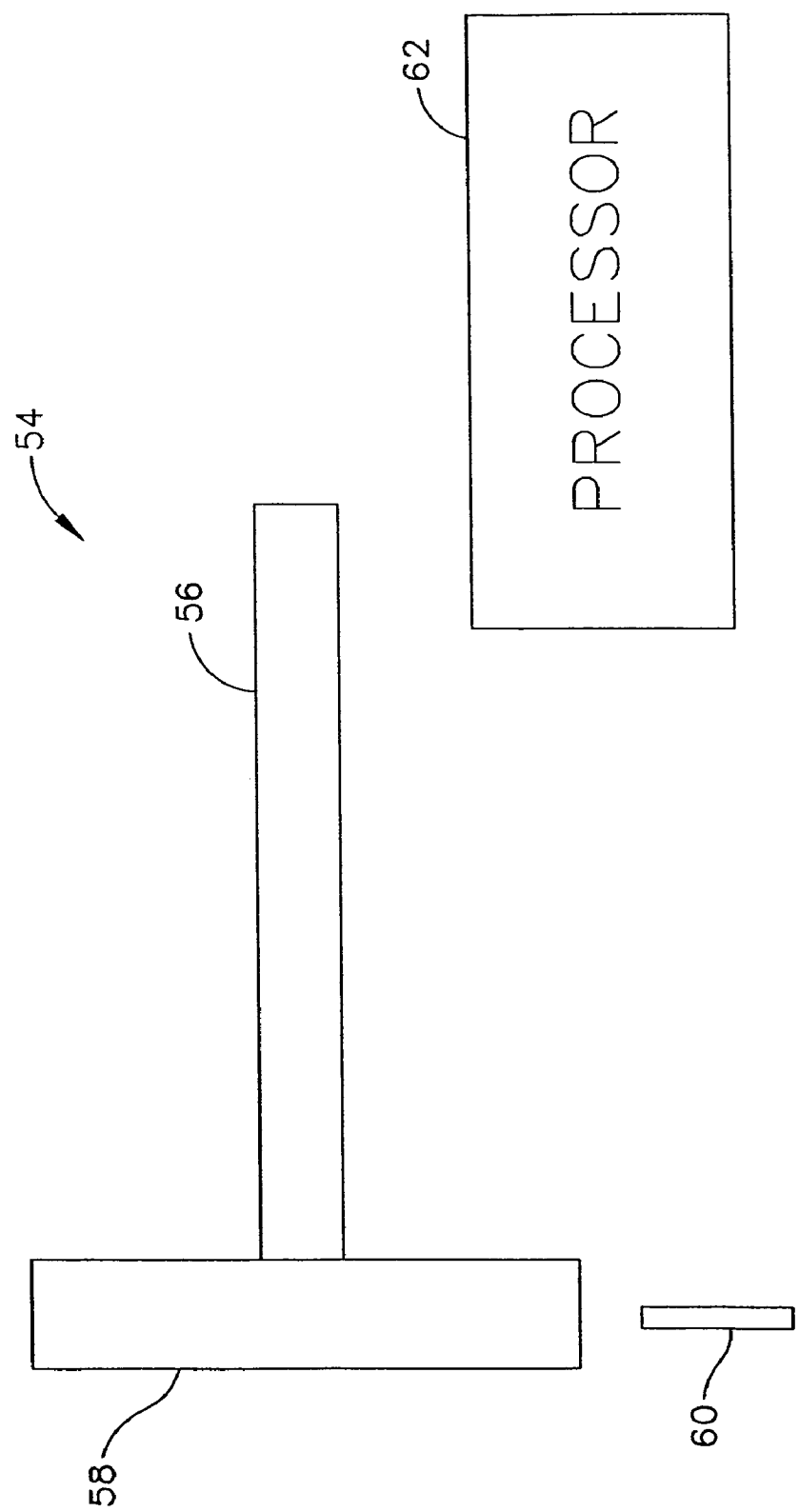
FIG. 2 is a diagram of an exemplary system used to decode a signal received from rotating machinery, such as the gas turbine engine shown in FIG. 1.

FIG. 2 is a diagram of an exemplary embodiment of a system 54 that may be used to decode a signal, as described in more detail below. System 54 includes a shaft 56, a rotating portion 58 attached to shaft 56, a sensor 60, and a processor 62. Second drive shaft 32 (FIG. 1) may represent shaft 56. Fan section 14 (FIG. 1) may represent rotating portion 58. In one embodiment, processor 62 includes a 16F877 peripheral interface controller (PIC) microprocessor commercially available from Microchip® Technology Corporation. Sensor 60 includes an electromagnetic device (not shown) that induces a magnetic field circumferentially about rotating portion 58. Sensor 60 also includes a device (not shown), such as a coil, which detects a change in the magnetic field as elements (not shown) within rotating portion 58 change the magnetic field. Fan blades 42 (FIG. 1) may represent the elements of rotating portion 58. Each rotating portion element generates a magnetic signal during each rotation of rotating portion 58. Thus, N number of elements within rotating portion 58 generate N magnetic signals during each rotation of rotating portion 58. N is a positive integer. Sensor 60 detects the N magnetic signals and generates N respective electrical signals from the N magnetic signals. Processor 62 receives the N electrical signals and processes the N electrical signals.

Figure 3:
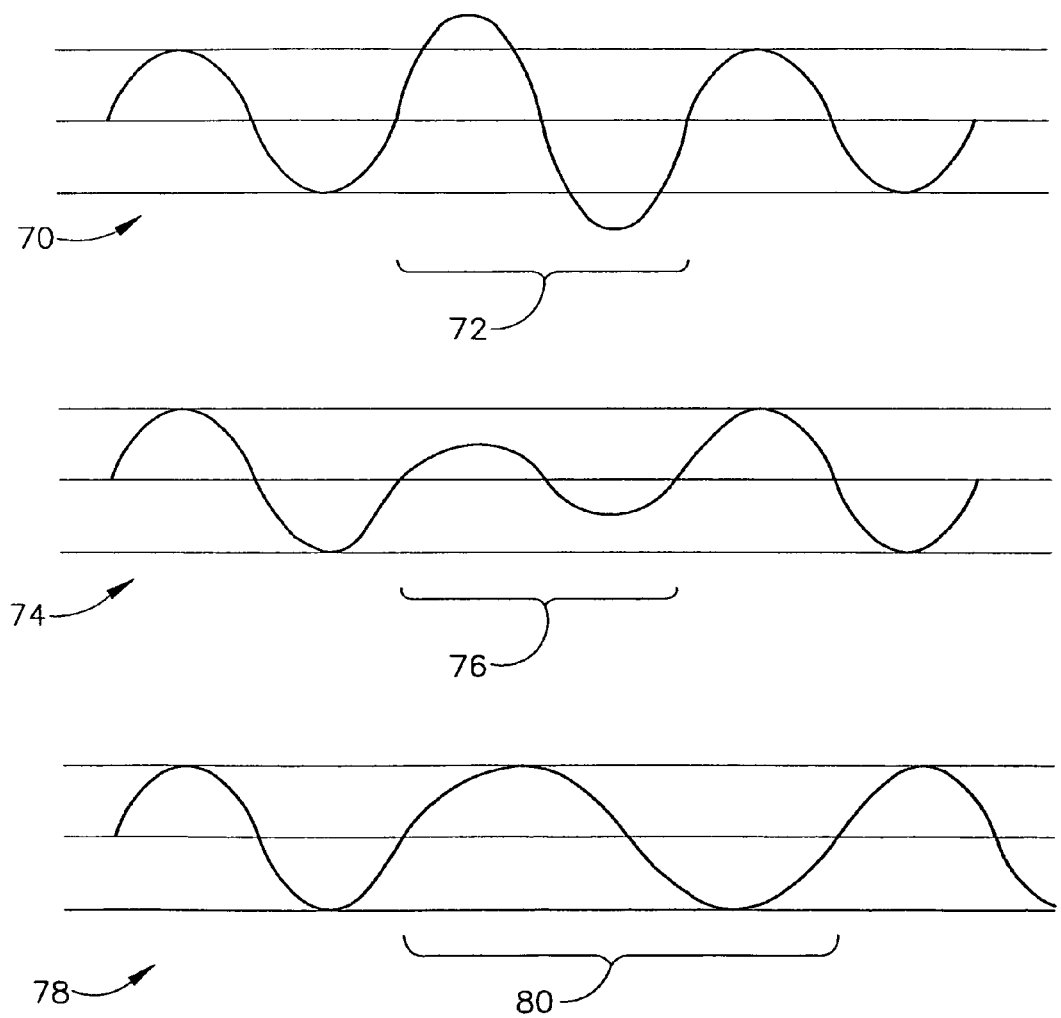
FIG. 3 is a graph of exemplary high tooth signal, low tooth signal, and wide tooth signal that may be generated by the rotating machinery.

FIG. 3 is a graph 70 of an exemplary high tooth signal 72 that has a higher peak-to-peak amplitude compared to peak-to-peak amplitudes of remaining of the N electrical signals shown in the graph. FIG. 3 is also a graph 74 of an exemplary low tooth signal 76 that has a lower peak-to-peak amplitude compared to peak-to-peak amplitudes of remaining of the N electrical signals shown in the graph. FIG. 3 also shows a graph 78 of an exemplary wide tooth signal 80 that has a longer duration of a peak-to-peak amplitude than durations of peak-to-peak amplitudes of remaining of the N electrical signals shown in the graph. Each of the high signal 72, low tooth 76, and the wide tooth signal 80 is an example of any one of the N electrical signals. Each of the high tooth signal 72, low tooth 76, and the wide tooth signal 80 is an odd tooth signal.

Figure 4:
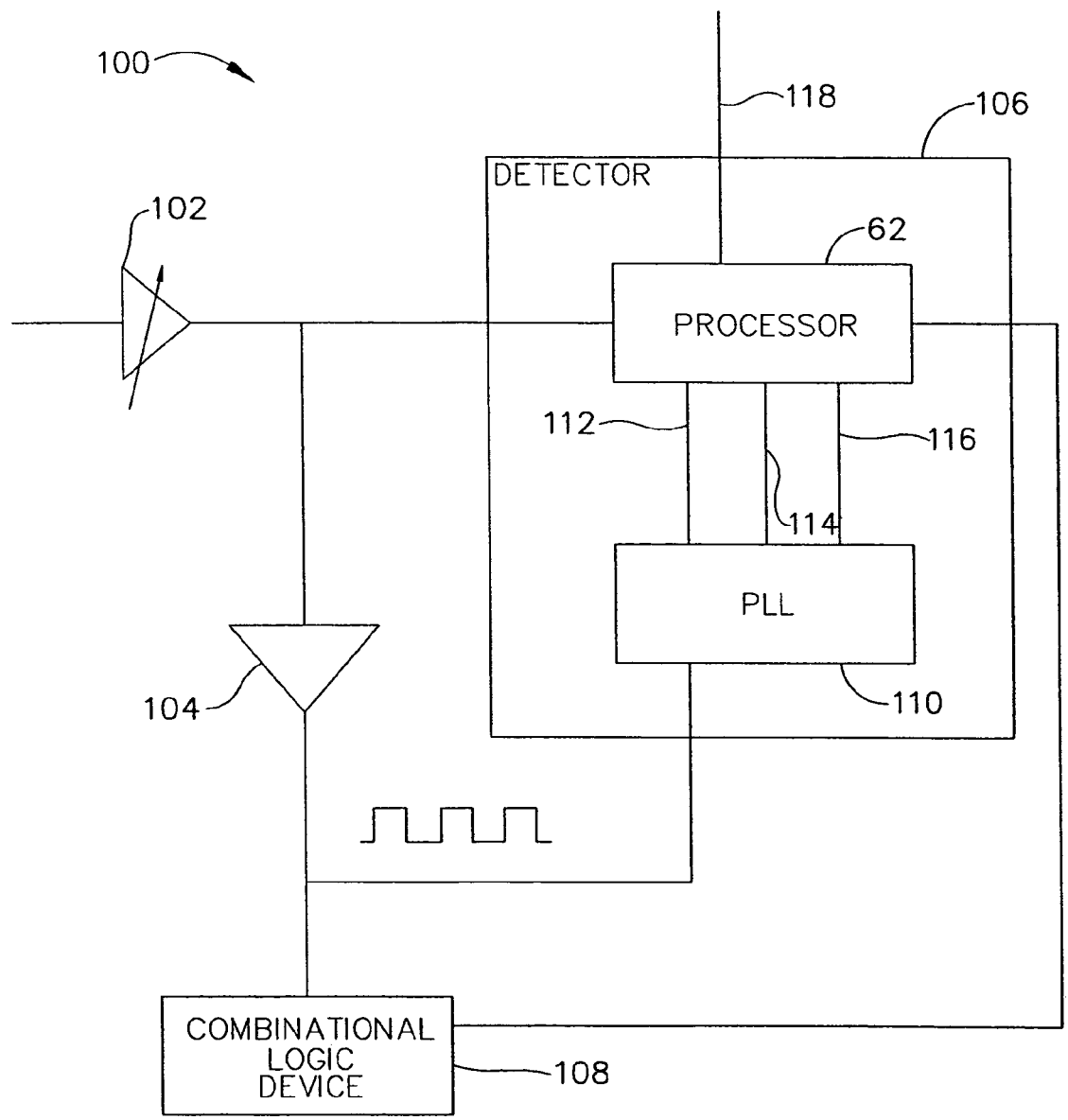
FIG. 4 is a diagram of an alternative embodiment of a system that may be used to decode a signal received from the rotating machinery.
Figure 5:
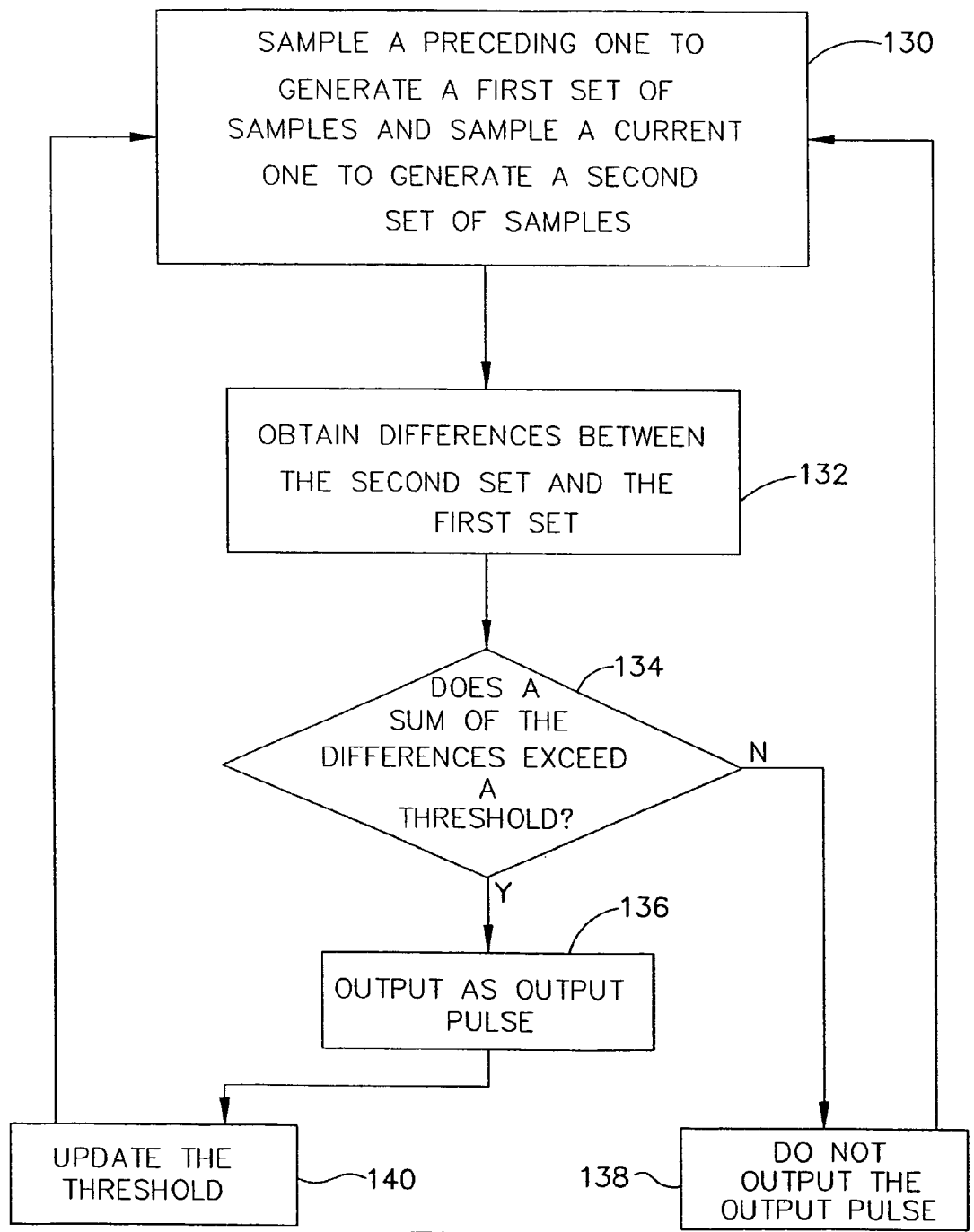
FIG. 5 is a flowchart of an exemplary embodiment of a method for decoding a signal executed by using the system shown in FIG. 2 or in FIG. 4.

FIG. 4 is a diagram of an exemplary system 100 for decoding a signal and FIG. 5 is a flowchart of an exemplary method for decoding a signal. System 100 includes an adjustable gain amplifier 102, a zero-crossing detector 104, a detector 106, and a combinational logic device 108. Detector 106 includes processor 62 and a phase-locked loop oscillator 110. Phase-locked loop oscillator 110 includes a phase comparator circuit (not shown), a voltage-controlled oscillator (VCO) (not shown), and divide-by-n circuit (not shown), where n equals $2^z$, where Z is an integer. An example of phase-locked loop oscillator 110 includes a 4046 phase-locked loop oscillator commercially available from Motorola® Corporation. In an alternative embodiment, zero-crossing detector 104 is connected to processor 62. In yet another alternative embodiment, zero-crossing detector 104 is connected to processor 62 and phase-locked loop oscillator 110.

Adjustable gain amplifier 102 receives the N electrical signals from sensor 60 and proportionally adjusts peak-to-peak amplitudes of the N electrical signals to generate N adjusted signals. Adjustable gain amplifier 102 proportionally adjusts peak-to-peak amplitudes of the N electrical signals to match a highest one of the peak-to-peak amplitudes with a constant peak-to-peak amplitude. For example, adjustable gain amplifier 102 proportionally reduces peak-to-peak amplitudes of the N electrical signals that are higher compared to peak-to-peak amplitudes of the N electrical signals before an increase in an angular speed of rotating portion 58. The peak-to-peak amplitudes of the N electrical signals that are higher after the increase in the angular speed are proportionally reduced to match a highest peak-to-peak amplitude among the peak-to-peak amplitudes to the constant peak-to-peak amplitude. Adjustable gain amplifier 102 proportionally reduces peak-to-peak amplitudes of the N electrical signals so that a reduction in a peak-to-peak amplitude of any one of the N electrical signals is proportional to reductions in peak-to-peak amplitudes of remaining of the N electrical signals. As another example, adjustable gain amplifier 102 proportionally increases peak-to-peak amplitudes of the N electrical signals that are lower compared to peak-to-peak amplitudes of the N electrical signals before a decrease in the angular speed of rotating portion 58. Peak-to-peak amplitudes of the N electrical signals that are lower after the decrease in the angular speed are proportionally increased to match a highest peak-to-peak amplitude among the peak-to-peak amplitudes to the constant peak-to-peak amplitude. Adjustable gain amplifier 102 proportionally increases peak-to-peak amplitudes of the N electrical signals so that an increase in a peak-to-peak amplitude of any one of the N electrical signals is proportional to increases in peak-to-peak amplitudes of remaining of the N electrical signals.

Zero-crossing detector 104 receives the N adjusted signals from adjustable gain amplifier 102. Zero-crossing detector 104 generates a train of square pulses from the N adjusted signals. Since the N electrical signals generated by sensor 60 depend on a rate of change of the magnetic field, each of the N electrical signals alternate between negative and positive values. When one of the N adjusted signals crosses zero in a positive direction, an output of the zero-crossing detector 104 is set to a first level. When one of the N adjusted signals crosses zero in a negative direction, an output of the zero-crossing detector 104 is set to a second level different than the first level. For example, an output of zero-crossing detector 104 becomes high when one of the N adjusted signals crosses zero in the positive direction. An output of the zero-crossing detector 104 becomes low when one of the N adjusted signals crosses zero in the negative direction.

Phase-locked loop oscillator (PLL) 110 receives the train of square pulses and generates a pre-determined number of signals from the train. The N adjusted pulses are fed to one input of the phase comparator circuit of phase-locked loop oscillator 110. An output of the VCO is fed back to another input of the phase comparator circuit, via the divide-by-n counter. Dividing by n outputs a series of pulses that have n times a frequency of the N adjusted pulses. The series of pulses is then divided by N, so that the pre-determined number of signals have $N*2^Z$ pulses during every complete 360° rotation of rotating portion 58, where '*' represents multiplication. The pre-determined number of signals are output from phase-locked loop oscillator 10 to processor 62 via a link 112.

Processor 62 receives the N adjusted signals from adjustable gain amplifier 102 and also receives the pre-determined number of signals from phase-locked loop oscillator 110 via link 112. Processor 62 includes an analog-to-digital converter (not shown) that samples the N adjusted signals synchronous with the pre-determined number of signals. The analog-to-digital converter of processor 62 samples the N adjustable signals at a rate at which processor 62 is clocked by the pre-determined number of signals received from phase-locked loop oscillator 110. In one embodiment, the analog-to-digital converter samples approximately a half wave of each of the N adjusted signals. In an alternative embodiment, the analog-to-digital converter samples a half wave of each of the N adjusted signals.

The analog-to-digital converter samples a half wave of each of the N adjusted signals based on the train of square pulses generated by zero-crossing detector 104. The train of square pulses are received by processor 62 via a link 114. The analog-to-digital converter is enabled or is alternatively disabled to sample the N adjusted signals. The analog-to-digital converter is enabled or is alternatively disabled by the train of square pulses. As an example, the analog-to-digital converter is enabled between the first level and the second level that is consecutive to the first level, and is disabled between the consecutive second level and the first level output consecutive to the consecutive second level. As another example, the analog-to-digital converter samples a first half wave of any of the N adjusted signals. As yet another example, the analog-to-digital converter is disabled between the first level and the consecutive second level output by zero-crossing detector 104, and is enabled between the consecutive second level and the consecutive first level. As still another example, the analog-to-digital converter samples a second half wave of any of the N adjusted signals. As another example, the analog-to-digital converter is enabled between the first level and the consecutive second level output by zero-crossing detector 104, and is enabled between the consecutive second level and the consecutive first level. In another example, the analog-to-digital converter samples a full wave of any of the N adjusted signals. In yet another example, the analog-to-digital converter samples approximately a full wave of any of the N adjusted signals.

The analog-to-digital converter samples 130 a preceding one of the N adjusted signals to generate a first set of sampled data and samples 130 a current one of the N adjusted signals to generate a second set of sampled data. As an example, the first set includes eight samples sampled from a half wave of the preceding one and the second set includes eight samples sampled from a half wave of the current one. Each of the first and second sets of sampled data include a number of samples that satisfy Nyquist criterion. The preceding one precedes the current one of the N adjusted signals. Processor 62 calculates 132 differences between the second set and the first set of sampled data. For example, processor 62 calculates a difference between a first sample of the second set and a first sample of the first set, a difference between a second sample of the second set and a second sample of the first set and so on until remaining differences between remaining samples of the second and first sets of sampled data are obtained.

Processor 62 computes a sum of the differences between the samples of the second and the first sets. Processor 62 compares the sum to a first threshold to determine 134 whether the sum exceeds the first threshold. In one embodiment, the sum is an absolute value. An example of the first threshold is a constant, such as, one. In the example, when processor 62 is turned on, a value of the first threshold stored in a memory (not shown), coupled to processor 62, equals one. Examples of the memory include a computer-readable medium such as a volatile memory. An example of the volatile memory is a random access memory. Processor 62 generates 136 an output pulse when the sum exceeds the first threshold. If the sum does not exceed the first threshold, processor 62 does not generate 138 the output pulse. Alternatively, when the sum exceeds the first threshold, processor 62 generates a true value, such as, for example, a '1', and when the sum does not exceed the first threshold, processor 62 generates a false value, such as, for example, a '0'.

Processor 62 updates 140 the first threshold to generate a second threshold. Processor 62 calculates the second threshold that is based on the differences and the first threshold. As an example, the second threshold is based on a fractional value of an addition of the sum of the differences and the first threshold. As another example, the second threshold is equal to a fractional value, such as, for example, 0.75, of an addition of the first threshold and a fraction of the sum of the differences. As yet another example, $$\text{the second threshold equals } 0.75*((\text{the sum of the differences})/4) + \text{the first threshold}) \quad (1)$$

where '*' represents multiplication.

The second threshold replaces the first threshold and the second threshold is used during a next cycle of execution of 130, 132, 134, 136, and 140. For example, in the next cycle when processor 62 generates the output pulse, processor 62 applies the second threshold during execution of 134. Moreover, in the next cycle, during execution of 140, processor 62 calculates a third threshold from the second threshold by replacing the second threshold with the third threshold in the equation (1) and by replacing the first threshold with the second threshold in the equation (1). After multiple cycles of execution of 130, 132, 134, 136, and 140, a threshold during a cycle of execution of 130, 132, 134, 136, and 140 stabilizes at 75 percent of a sum of differences between the second and first sets of sampled data during the cycle. When processor 62 is reenergized after a loss of power supplied to processor 62, processor 62 initiates executing the method for decoding a signal by applying the first threshold at 134 and by obtaining, at 140, the second threshold from the first threshold.

Phase-locked loop oscillator 110 outputs a lock detect signal to processor 62. When phase-locked loop oscillator 110 outputs a first lock detect signal to processor 62 via a link 116, processor 62 is enabled to generate the output pulse. When phase-locked loop oscillator 110 outputs a second lock detect signal to processor 62 via link 116, processor 62 is disabled and cannot generate the output pulse.

Processor 62 subtracts an amount from a threshold, such as the first threshold or alternatively the second threshold, after every pre-determined number of the adjusted signals are received from adjustable gain amplifier 102. An example of the pre-determined number of adjusted signals is $2^Y$, where Y is an integer greater than zero. An example of the amount subtracted is one. As another example, processor 62 subtracts one from the threshold after every 64 adjusted signals are received from adjustable gain amplifier 102.

Detector 106 includes a counter (not shown) that counts a number of the adjusted signals between two consecutive output pulses output by processor 62. The counter outputs a count. The counter counts a number of the adjusted signals based on the train of square pulses received from zero-crossing detector 104. The number of the adjusted signals are equal to a number of the elements of rotating portion 58 between the two consecutive output pulses. Processor 62 receives the count from the counter and generates the output pulse at a time that precedes, by one element of rotating portion 58, a time at which the output pulse would have been generated without considering the count. In an alternative embodiment, detector 106 does not include the counter.

Combinational logic device 108 receives the output pulse from processor 62. Based on the train of square pulses, combinational logic device 108 delays the output pulse to coincide with a zero crossing in the negative, or alternatively the positive direction. For example, combinational logic device 108 includes a time delay circuit (not shown) that holds the output pulse for a pre-determined duration until a zero crossing in the negative, or alternatively the positive direction is received, and outputs the output pulse at the zero crossing. Combinational logic device 108 also changes a duration of the output pulse. For example, combinational logic device 108 includes a timer (not shown), such as, a one-shot timer, which receives the output pulse and generates a pulse of a pre-determined duration.

Combinational logic device 108 is controlled by a switch (not shown) having a first, second, and a third, and a fourth position. The first position enables combinational logic device 108 to receive the output pulse. The second position enables combinational logic device 108 to receive pulses from a plurality of detectors that receive high tooth signal 72 and that have threshold levels are manually controlled. The third position enables combinational logic device 108 to receive pulses from a plurality of detectors that receive low tooth signal 76 and that have threshold levels that are manually controlled. The fourth position enables combinational logic device 108 to receive pulses from a plurality of detectors that receive wide tooth signal 80 and that have threshold levels are manually controlled. In an alternative embodiment, system 100 does not include combinational logic device 108. In yet another alternative embodiment, processor 62 is coupled via a cable 118, such as an RS-232 cable to a computer, such as a laptop, a desktop, or both the laptop and the desktop. Cable 118 is used to communicate with the computer. For example, the method for decoding a signal is uploaded from the computer via cable 118 to processor 62. It is noted that the method for decoding a signal can be stored in the memory and can be executed by processor 62 or alternatively the computer.

Technical effects of the systems and methods for decoding a signal include decoding the odd signal without a need to provide a first system that decodes high tooth signal 72 and that is separate from a second system for decoding low tooth signal 76. There is also no need to provide a third system that decodes wide tooth signal 80 and that is separate from the first and second systems. Specifically, high tooth signal 72 is decoded by applying a first manually adjusted threshold that is separate from a second manually adjusted threshold applied to decode low tooth signal 76. The first and second manually adjusted thresholds are different than a third manually adjusted threshold that is applied to decode wide tooth signal 80. Further, technical effects of the systems and methods for decoding a signal include automatic updates of the first threshold and the second threshold by processor 62. Gas turbine engine 30 is balanced by decoding the odd tooth signal.

While the invention has been described in terms of various specific embodiments, those skilled in the art will recognize that the invention can be practiced with modification within the spirit and scope of the claims.

What is claimed is:

1. A system for decoding a signal of a rotating portion of a machine, said system comprising:
   a sensor configured to output N signals based on signals received from the rotating portion;
   a phase-locked loop oscillator configured to convert the N signals into a pre-determined number of signals; and
   a processor configured to derive a value from a plurality of differences between sampled data obtained from the N signals.

2. A system in accordance with claim 1 wherein said processor is further configured to generate an output pulse when the value exceeds a first threshold, and the value is a sum of the plurality of differences.

3. A system in accordance with claim 1 wherein said processor is further configured to generate an output pulse when the value exceeds a first threshold and to calculate a second threshold that is based on the differences and the first threshold.

4. A system in accordance with claim 1 wherein said processor is further configured to generate an output pulse when the value exceeds a first threshold and the first threshold equals a constant.

5. A system in accordance with claim 1 wherein said processor is further configured to sample the N signals, and said processor is further configured to be clocked by the pre-determined number of signals.

6. A system in accordance with claim 1 wherein said processor is further configured to sample approximately half of each of the N signals.

7. A system in accordance with claim 1 further comprising a phase-locked loop oscillator configured to output a lock detect signal to said processor, wherein said processor is further configured to generate an output pulse when the value exceeds a first threshold, and said processor is enabled to output the output pulse when said processor receives the lock detect signal from said phase-locked loop oscillator.

8. A system in accordance with claim 1 wherein said processor is further configured to generate an output pulse when the value exceeds a first threshold.

9. A system in accordance with claim 1 wherein said processor is further configured to generate an output pulse when the value exceeds a first threshold and said processor is configured to subtract an amount from the first threshold after a pre-determined number of signals are received from the sensor.

10. A system comprising:
    a shaft;
    a rotating portion attached to said shaft;
    a sensor configured to output N signals based on signals received from the rotating portion;
    a phase-locked loop oscillator configured to convert the N signals into a pre-determined number of signals; and
    a processor configured to derive a value from a plurality of differences between sampled data obtained from the N signals.

11. A system in accordance with claim 10 wherein said rotating portion includes a fan and said system includes a turbine engine.

12. A system in accordance with claim 10 wherein said processor is configured to generate an output pulse when the value exceeds a first threshold.

13. A system in accordance with claim 10 wherein said processor is configured to generate an output pulse when the value exceeds a first threshold and said processor configured to calculate a second threshold that is based on the differences and the first threshold.

14. A system in accordance with claim 10 wherein said processor is configured to generate an output pulse when the value exceeds a first threshold and the first threshold equals a constant.

15. A system in accordance with claim 10 wherein said processor is further configured to sample the N signals, and said processor is further configured to be clocked by the pre-determined number of signals.

16. A method for decoding a signal of a rotating portion of a machine, said method comprising:
    generating N signals from signals sensed by the rotating portion;
    converting the N signals into a pre-determined number of signals;
    calculating differences between data sampled from the N signals;
    computing a value from the differences; and
    using the value to balance the rotating portion of the machine.

17. A method in accordance with claim 16 further comprising generating an output pulse when the value exceeds a threshold.

18. A method in accordance with claim 16 further comprising generating an output pulse when the value exceeds a first threshold; and calculating a second threshold based on the differences and the first threshold.

* * * * *